(12) United States Patent
Lo

(10) Patent No.: US 10,283,897 B1
(45) Date of Patent: May 7, 2019

(54) FAST PULL-TO-PENETRATE DEVICE FOR CONNECTOR

(71) Applicant: Chi-Wei Lo, Taipei (TW)

(72) Inventor: Chi-Wei Lo, Taipei (TW)

( * ) Notice: Subject to any disclaimer, the term of this patent is extended or adjusted under 35 U.S.C. 154(b) by 0 days.

(21) Appl. No.: 16/005,701

(22) Filed: Jun. 12, 2018

(51) Int. Cl.
| | |
|---|---|
| *H01R 13/50* | (2006.01) |
| *H01R 13/502* | (2006.01) |
| *H01R 13/627* | (2006.01) |
| *H01R 9/03* | (2006.01) |
| *H01R 13/02* | (2006.01) |
| *H01R 13/447* | (2006.01) |
| *H01R 13/52* | (2006.01) |
| *H01R 13/66* | (2006.01) |
| *H01R 13/58* | (2006.01) |
| *H01R 13/24* | (2006.01) |

(52) U.S. Cl.
CPC ............. *H01R 13/502* (2013.01); *H01R 9/03* (2013.01); *H01R 13/025* (2013.01); *H01R 13/447* (2013.01); *H01R 13/5213* (2013.01); *H01R 13/627* (2013.01); *H01R 13/66* (2013.01); *H01R 13/24* (2013.01); *H01R 13/58* (2013.01)

(58) Field of Classification Search
CPC ...... H01R 13/502; H01R 9/03; H01R 13/025; H01R 13/447; H01R 13/513
USPC ........................................................ 439/497
See application file for complete search history.

(56) References Cited

U.S. PATENT DOCUMENTS

| | | | | | |
|---|---|---|---|---|---|
| 3,475,716 | A | * | 10/1969 | Laig .................. | H01R 13/6392 24/16 PB |
| 4,204,738 | A | * | 5/1980 | Tillotson ............ | H01R 13/6392 439/369 |
| 4,664,463 | A | * | 5/1987 | Carmo ............... | H01R 13/6392 439/369 |
| 6,152,608 | A | * | 11/2000 | Ghara ................. | G02B 6/3893 385/60 |
| 6,648,520 | B2 | * | 11/2003 | McDonald .......... | G02B 6/3869 385/59 |
| 7,186,130 | B1 | * | 3/2007 | Miller ................. | H01R 13/639 439/369 |
| 7,442,067 | B1 | * | 10/2008 | Amaral ............... | H01R 13/639 439/367 |
| 7,887,360 | B2 | * | 2/2011 | Andrade ............ | H01R 13/6392 439/369 |
| 7,914,306 | B1 | * | 3/2011 | Blackwell .......... | H01R 13/5213 439/135 |
| 7,972,165 | B1 | * | 7/2011 | Lifson ................ | H01R 13/6392 439/369 |

(Continued)

*Primary Examiner* — Alexander Gilman
(74) *Attorney, Agent, or Firm* — Leong C. Lei

(57) ABSTRACT

A fast connector pull-to-penetrate device includes a pull-through and penetration device that includes two flexible extension arms, each having a free end formed with a through aperture. A cap is formed with a coupling opening in each of two opposite sides thereof. The pull-through and penetration device is selectively fit to a transmission cable at an end of a connector and the cap is attached to the connector and fit to a signal terminal of the connector, such that the extension arms are respectively received through the coupling openings of the cap to have the through apertures moved past the two coupling openings and located frontward of the cap. A rope is tied to the through apertures of the extension arms to allow the pull-through and penetration device, to be moved through a number of installation holes through pulling of the rope.

7 Claims, 4 Drawing Sheets

(56) References Cited

U.S. PATENT DOCUMENTS

| | | | | |
|---|---|---|---|---|
| 8,337,236 | B2 * | 12/2012 | Shu | H01R 13/6395 |
| | | | | 439/369 |
| 8,758,046 | B2 * | 6/2014 | Pezzetti | H01R 13/60 |
| | | | | 439/527 |
| 9,077,111 | B2 * | 7/2015 | Brown | H01R 13/6392 |
| 9,088,103 | B2 * | 7/2015 | Johnson | H01R 13/6392 |
| 9,160,099 | B2 * | 10/2015 | Pfiffi | H01R 13/5205 |
| 9,368,966 | B2 * | 6/2016 | Green | H02J 3/00 |
| 9,385,475 | B1 * | 7/2016 | Barna | H01R 13/6392 |
| 9,413,101 | B1 * | 8/2016 | Nooner | H01R 13/5208 |
| 9,444,920 | B2 * | 9/2016 | Baschnagel | H04M 1/04 |
| 9,583,878 | B2 * | 2/2017 | Bozikis | H01R 13/6392 |
| 9,644,828 | B1 * | 5/2017 | May | F21V 7/00 |
| 9,647,390 | B1 * | 5/2017 | Creato | H01R 13/6392 |
| 9,837,755 | B2 * | 12/2017 | Hsu | G02B 6/36 |
| 2006/0035508 | A1 * | 2/2006 | Stekelenburg | H01R 13/6392 |
| | | | | 439/369 |

* cited by examiner

FAST PULL-TO-PENETRATE DEVICE FOR CONNECTOR

(a) TECHNICAL FIELD OF THE INVENTION

The present invention relates generally to a fast pull-to-penetrate device for a connector, and more particularly to a device that comprises a pull-through and penetration device that is fit to a transmission cable at an end of the connector and a cap that is fit to a signal terminal at a front end of the connector, with two extension arms provided on the pull-through and penetration device being respectively received through two coupling openings formed in the cap to be located frontward of the cap and the pull-through and penetration device being of a conic configuration, and a rope (or a steel wire) being tied to the through apertures of the two extension arms, so that in a process of installing the connector and the transmission cable, a cable installation worker is allowed to pull the rope (or the steel wire) to have the pull-through and penetration device and the connector and the transmission cable efficiently and easily penetrate through a number of installation holes to achieve an effect of easy operation and protection of the connector against damages.

(b) DESCRIPTION OF THE PRIOR ART

Fiber-optic communication, which has been developed for a long time, is generally referred to a method of sending information with light through an optical fiber. Fiber-optic communication is one kind of wired communication. Fiber-optic communication provides a revolutionary effect on the telecommunication industry and plays a vital role in the digital era. This is because fiber-optic communication possesses various advantages, including large transmission capacity, high speed, and excellent security.

A fiber-optic transmission line generally works to first convert an electrical signal into an optic signal, transmit the optical signal through an optic fiber, and finally receive the optic signal with an optic receiver for conversion back to an electrical signal. The transmission of a signal is achieved with such a way. An optic signal connector that is involved in a fiber-optic transmission line is generally more expensive and structurally weaker than an electrical signal connector (such as an universal series bus (USB) connector).

For aesthetics of indoor decoration, it is common, in an indoor decoration work, to arrange all sorts of electrical cables (such as electric mains and telephone lines) and signal transmission cables (such as high-definition multimedia interface (HDMI) cables and fiber-optic transmission lines) to extend in the interior of a wall for subsequent extension from the interior of the wall to outside the wall and reach into an indoor space. These signal cables are buried in and penetrate through the walls. Most of signal connectors provided on the signal transmission lines have a rectangular shape so that they may be easily interfered with by an installation hole formed in the wall. Further, decoration holes and penetration holes may be of different specifications at different areas or countries. These factors make a regular operation of installing the signal transmission lines very labor-consuming and time-consuming. In addition, to lay a signal transmission line for an extended range, it is often that the signal transmission line must penetrate through a number of installation holes and extend a long distance along an installation path. It is common that such installation holes and the installation path are arranged at a high location and this makes the installation operation difficulty and dangerous. In addition, the signal connectors of the signal transmission lines are often completely exposed, without any protection, during the installation operation so that when the signal connectors are put through the installation holes, the signal connectors are readily damaged through impact and abrasion with the installation holes. The impact and abrasion may cause a great influence on the performance particularly for an optic fiber connector that is generally more expensive and structurally weaker.

Thus, the present invention aims to provide a technical solution for a fast pull-to-penetrate device for connectors that is simple and easy to use so that signal connectors of signal transmission lines could penetrate through multiple installation holes easily in a manner that the signal connectors are effectively protected against damages during penetration.

SUMMARY OF THE INVENTION

The present invention provides a fast connector pull-to-penetrate device, which is combinable with a connector. The connector has an end that is provided with a signal terminal and an opposite end that is connected to a transmission cable. The fast connector pull-to-penetrate device comprises: a pull-through and penetration device and a cap. The pull-through and penetration device comprises a base and at least two flexible extension arms extending from the base. The extension arms each have a free end that is formed with a through aperture. The base is fit over the transmission cable and is set at an end of the connector. The two extension arms are set to extend in a direction similar to that of the signal terminal. The extension arms have a length that is greater than a length of the connector such that the through apertures of the extension arms are set at a location frontward of the signal terminal. The cap has two opposite sides each formed with a coupling opening and the two extension arms of the pull-through and penetration device are respectively receivable through the two coupling openings of the cap.

The present invention is characterized in that a pull-through and penetration device is provided with a base that is fit over a transmission cable and set at a location of an end of the connector, and the base is provided with two extension arms that are flexible and elastic and the cap has two opposite sides respectively formed with coupling openings through which the two extension anus are receivable, wherein the cap is attached to a front end of the connector and is fit to a signal terminal with the two extension arms respectively received through the two coupling openings of the cap to have the pull-through and penetration device and the cap mounted to the connector at an outside thereof to show a conic configuration, and the through apertures of the two extension arms passing through the two coupling openings to be located frontward of the cap, wherein a rope (or a steel wire) can be tied to the through apertures of the two extension anus so that a cable installation worker, during the process of installing the connector and the transmission cable, may first put the rope (or the steel wire) through pre-formed installation holes and uses the rope (or the steel wire) to pull and move the pull-through and penetration device and the connector, together with the transmission cable so as to have the pull-through and penetration device and the connector, together with the transmission cable, readily moved and penetrating through a number of installation holes to achieve an effect of easy operation and protection of the connector against damages.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
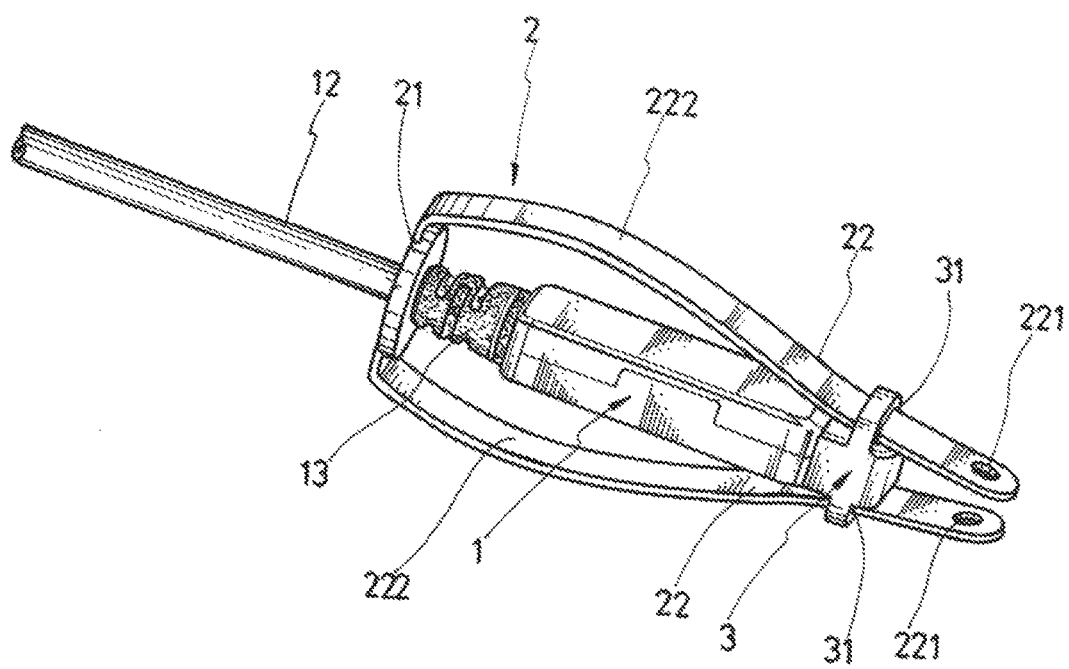
FIG. 1 is a schematic view showing a fast pull-to-penetrate device according to the present invention combined with a connector.
Figure 2:
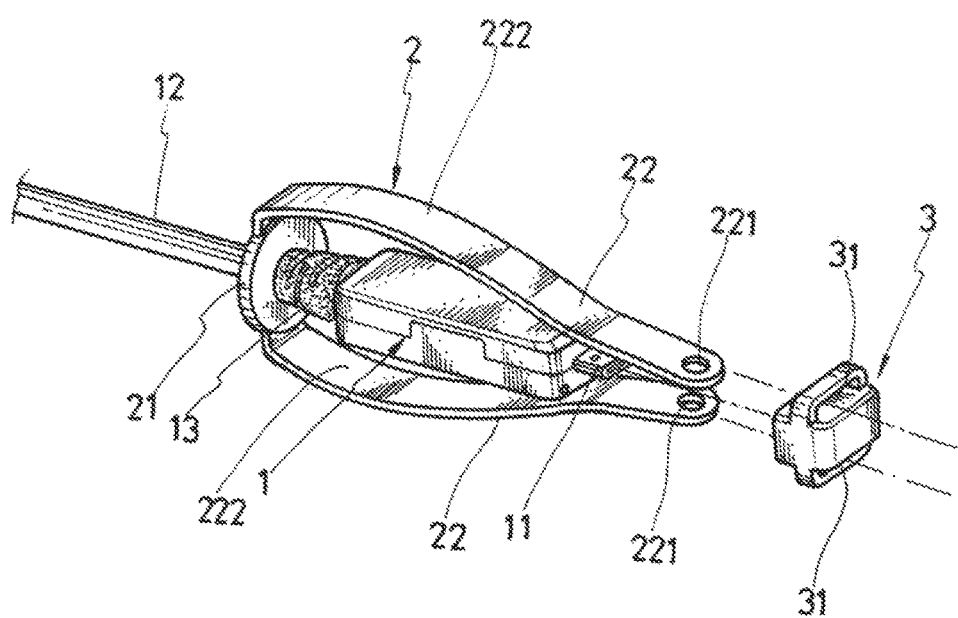
FIG. 2 is a schematic view showing, in a partially exploded form, the fast pull-to-penetrate device of the present invention combined with a connector.
Figure 3:
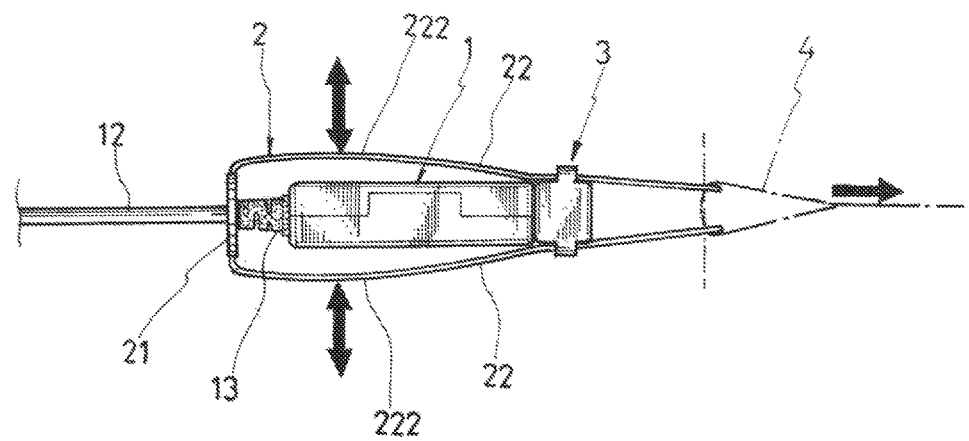
FIG. 3 is a schematic view showing a use of the fast pull-to-penetrate device of the present invention, which is combined with a connector.
Figure 4:
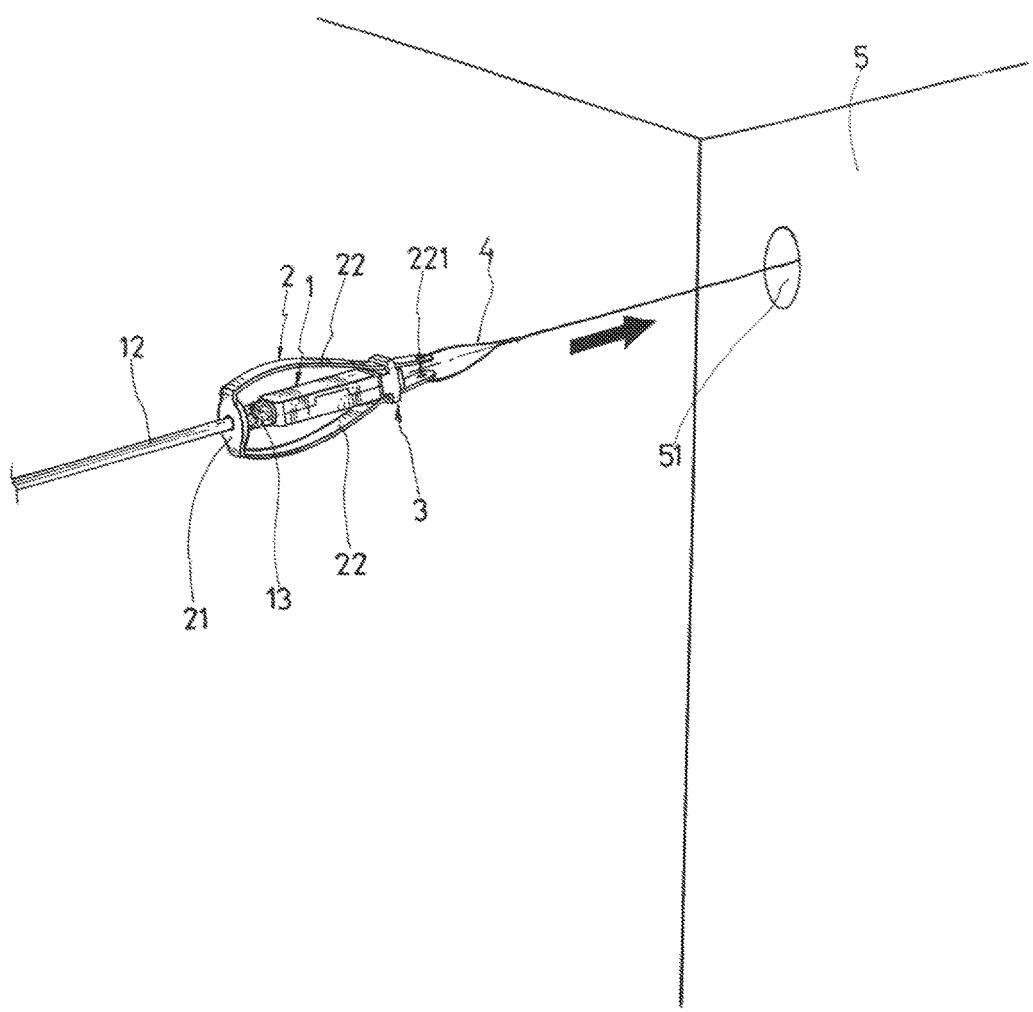
FIG. 4 is a schematic view showing an example of application of the fast pull-to-penetrate device of the present invention.

Referring to FIGS. 1, 2, 3, and 4, the present invention provides a fast pull-to-penetrate device, which is combinable with a connector 1, and for easy reference, the device will be referred to as a fast connector pull-to-penetrate device. The connector 1 to which the device is combinable has one end that is provided with a signal terminal 11 and an opposite end that is electrically connected with a transmission cable 12. The fast connector pull-to-penetrate device according to the present invention comprises a pull-through and penetration device 2 and a cap 3.

The pull-through and penetration device 2 comprises a base 21 and at least two extension arms 22 extending from the base 21. The extension arms 22 have the property of flexibility and elasticity. Each of the extension arms 22 has a free end (which is the end that is not connected to or is distant from the base 21) that is formed with a through aperture 221. Each of the extension arms 22 comprises a curved section 222 that bulges outward and extends between the base 21 and the through aperture 221. The base 21 is provided for fitting to and attached to the transmission cable 12 and is arranged at a location corresponding to the end of the connector 1. The two extension arms 22 are arranged to extend in the same direction as that of the signal terminal 11. The extension arms 22 have a length that is greater than a length of the connector 1. The two extension arms 22 are arranged locations that are at outside of the connector 1 such that the through apertures 221 of the extension arms 22 are at a location in front of (or extend frontward beyond) the signal terminal 11. The base 21 can be of any desired configuration, such as a circular shape and a square shape. The base 21 has a diameter or a planar size that is smaller than a hole diameter of an installation hole 51 formed in a wall 5.

The cap 3 is fit to and thus attached to the signal terminal 11 and is coupled with the two extension arms 22 of the pull-through and penetration device 2. The cap 3 has two opposite sides each of which is formed with a coupling opening 31. The two coupling openings 31 of the cap 3 are arranged such that a spacing distance therebetween is smaller than the diameter or the planar size of the base 21 of the pull-through and penetration device 2. The cap 3 is attachable to a front end of the connector 1 and is fit to and attached to the signal terminal 11. The two extension arms 22 of the pull-through and penetration device 2 are respectively received through the two coupling openings 31, such that the through apertures 221 of the two extension arms 22 pass through the two coupling openings 31 to be set at locations that are frontward of the cap 3. Further, since the spacing distance between the two coupling openings 31 of the cap 3 is smaller than the diameter of the base 21, when the two extension arms 22 are put through the two coupling openings 31, the curved sections 222 of the two extension arms 22 are deformed through further expanding outward and showing a configuration that diverges in a direction toward the through apertures 221, so that the pull-through and penetration device 2 and the cap 3 so combined show a conic or arrow-shaped configuration.

Further, the transmission cable 12 is provided, on an end thereof that corresponds to the connector 1, with a bending protection member 13 (which could be a strain relief). The bending protection member 13 is made of plastics and comprises a plurality of troughs arranged at intervals to provide the bending protection member 13 with the property of elasticity and flexibility. When the transmission cable 12 is provided with the bending protection member 13, the base 21 can be fit over the transmission cable 12 to be located immediately adjacent to the bending protection member 13. When the two extension arms 22 of the pull-through and penetration device 2 are pulled and stretched, the property of elasticity and flexibility realized with the plurality of troughs formed in the bending protection member 13 allows the base 21 to squeeze and compress the bending protection member 13 to thereby achieve an effect of cushioning and curving due to the elasticity and flexibility.

An example of the present invention will be described. When it is attempted to make the connector 1 penetrate through an installation hole 51 that is pre-formed in a wall 5, since the diameter of the base 21 of the pull-through and penetration device 2 is made smaller than a bore diameter of the installation hole 51 of the wall 5, a rope (or a steel wire) 4 can be provided and tied to the through apertures 221 of the two extension arms 22 so that a cable installation worker, during the process of installing the connector 1 and the transmission cable 12, may first put the rope (or the steel wire) 4 through the pre-formed installation hole 51 and uses the rope (or the steel wire) 4 to pull and move the pull-through and penetration device 2 and the connector 1, together with the transmission cable 12 connected to the connector 1. Since the pull-through and penetration device 2 and the cap 3 are combined to show a conic or arrow-shaped configuration, the pull-through and penetration device 2 and the connector 1, together with the transmission cable 12, could be readily moved and penetrating through the installation hole 51 (and may also for further penetrate through a number of installation holes) to achieve an effect of efficient and easy operation. Further, a cable installation worker is allowed to stay at a remote site and can still pull the rope (or the steel wire) 4 to cause or drive the pull-through and penetration device 2 and the connector 1, together with the transmission cable 12, to move through the installation hole 51 or to sequentially move through a number of installation holes.

In addition, the connector 1 is protected by the two extension arms 22 located outside the connector and the signal terminal 11 of the connector 1 is protected by the cap 3. Thus, during the installation operation of the connector 1, the connector 1 is protected from damages caused by impact or collision.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A fast connector pull-to-penetrate device, adapted to combine with a connector, wherein the connector has an end that is provided with a signal terminal and an opposite end that is connected to a transmission cable, the fast connector pull-to-penetrate device comprising:
   a pull-through and penetration device, which comprises a base and at least two extension arms extending from the base, the extension arms being flexible and elastic, the extension arms each having a free end that is formed with a through aperture, the extension arms having a curved section that bulges outward and extends between the base and the through aperture, the base being selectively fit over the transmission cable and set at an end of the connector, the two extension arms being set to extend in a direction similar to that of the signal terminal, the extension arms having a length that is greater than a length of the connector such that the through apertures of the extension arms are set at a location frontward of the signal terminal; and
   a cap, which is fit to the signal terminal and coupled to the two extension arms, the cap having two opposite sides each formed with a coupling opening;
   wherein the cap is attached to a front end of the connector and is fit to the signal terminal, such that the two extension arms are respectively received through the two coupling openings to have the through apertures of the two extension arms moved through the two coupling openings to be set at a location frontward of the cap.

2. The fast connector pull-to-penetrate device according to claim 1, wherein the transmission cable is provided, on an end thereof that corresponds to the connector, with a bending protection member, and the base is fit to the transmission cable at a location immediately adjacent to the bending protection member.

3. The fast connector pull-to-penetrate device according to claim 1, wherein the two coupling openings of the cap are arranged to have a spacing distance therebetween that is smaller than a diameter of the base such that when the two extension arms are respectively received through the two coupling openings, the curved sections of the two extension arms are expanded further outward and showing a configuration of diverging in a direction toward the through apertures.

4. The fast connector pull-to-penetrate device according to claim 3, wherein the pull-through and penetration device is combinable with the cap to show a conic configuration.

5. The fast connector pull-to-penetrate device according to claim 3, wherein the pull-through and penetration device is combinable with the cap to show an arrow-shaped configuration.

6. The fast connector pull-to-penetrate device according to claim 1, wherein the base has a diameter that is smaller than a diameter of an installation hole formed in a wall.

7. The fast connector pull-to-penetrate device according to claim 1, wherein the through apertures of the two extension arms are connectable with a rope tired thereto.

* * * * *